United States Patent Office 3,074,978
Patented Jan. 22, 1963

3,074,978
PROCESS FOR THE PREPARATION OF 13β-n-PROPYL-Δ⁴-GONENE-17β-OL-3-ONE AND THE INTERMEDIATES IN THE PREPARATION THEREOF
Gerard Nomine, Noisy-le-Sec (Seine), and Robert Bucourt, Villiers-le-Bel (Seine and Oise), France, assignors to Roussel-UCLAF, Paris, France, a corporation of France
No Drawing. Filed Jan. 3, 1962, Ser. No. 164,137
Claims priority, application France Jan. 11, 1961
5 Claims. (Cl. 260—397.4)

The invention relates to a novel method for the saponification of carboxylic acid esters of 13β-alkyl-Δ⁴-gonene-17β-ol-3-ones wherein the carboxylic acid is an organic carboxylic acid having 1 to 18 carbon atoms. The invention also relates to novel intermediates formed in the saponification process. The direct saponification of the said esters is particularly difficult and gives only mediocre yields.

It is an object of the invention to provide a novel process for the saponification of carboxylic acid esters of 13β-alkyl-Δ⁴-gonene-17β-ol-3-ones in high yields.

It is another object of the invention to obtain novel intermediates for the saponification of carboxylic acid esters of 13β-alkyl-Δ⁴-gonene-17β-ol-3-ones and particularly:

(a) The benzoic acid ester of 13β-n-propyl-Δ⁴-gonene-3,17β-diol
(b) 13β-n-propyl-Δ⁴-gonene-3,17β-diol.

These and other objects and advantages of the invention will become obvious from the following detailed description.

The process of the invention comprises reducing a carboxylic acid ester of 13β-alkyl-Δ⁴-gonene-17β-ol-3-one wherein the carboxylic acid is an organic carboxylic acid having 1 to 18 carbon atoms and the alkyl group has 1 to 18 carbon atoms with an alkali metal borohydride to form a carboxylic acid ester of 13β-alkyl-Δ⁴-gonene-3,17β-diol, reacting the latter under alkaline conditions to form 13β-alkyl-Δ⁴-gonene-3,17β-diol, selectively oxidizing the allylic hydroxy group of the latter to form 13β-alkyl-Δ⁴-gonene-17β-ol-3-one and recovering the latter.

A preferred mode of the process of the invention comprises reacting the carboxylic acid ester of the 13β-alkyl-Δ⁴-gonene-17β-ol-3-one with sodium borohydride to form the carboxylic acid ester of 13β-alkyl-Δ⁴-gonene-3,17β-diol, reacting the latter with an alkaline base such as an alkali metal hydroxide in a lower alkanol such as methanol or ethanol to form 13β-alkl-Δ⁴-gonene-3,17β-diol, oxidizing the latter with manganese dioxide to form 13β-alkyl-Δ⁴-gonene-17β-ol-3-one and recovering the latter. The reaction is illustrated in Table I.

wherein R is an alkyl radical having 1 to 18 carbon atoms and Ac is the acyl radical of an organic carboxylic acid having 1 to 18 carbon atoms.

The carboxylic acid esters of the 13β-alkyl-Δ⁴-gonene-17β-ol-3-ones are more fully described in the copending, commonly assigned U.S. application Serial No. 96,062 filed January 19, 1961. The 13β-alkyl radical is an alkyl radical having 1 to 18 carbon atoms. The carboxylic acids having 1 to 18 carbon atoms may be alkanoic or alkenoic acids, cycloalkyl alkanoic acids, aryl alkanoic acids or aryl carboxylic acids as set forth in said copending application.

The carboxylic acid esters of the 13β-alkyl-Δ⁴-gonene-17β-ol-3-one may be prepared according to the process disclosed in United States Patent application Serial No. 96,062 and is illustrated by the steps comprising reacting an allyl halide with 6-methoxy-3,4-dihydronaphthyl-(2,1)-isoxazole followed by hydrogenation to form 2-cyano-2-n-propyl-6-methoxy-tetralone-1, reacting the latter with dimethyl succinate to form 5-methoxy-13β-n-propyl-15-methoxycarbonyl-Δ⁵,⁷,⁹,¹⁴-des A-gonatetraene-17-one, reacting the latter with an alkali metal borohydride to form 5-methoxy-13β-n-propyl-15-carboxy-Δ⁵,⁷,⁹,¹⁴-des A-gonatetraene-17β-ol, heating the latter under acid conditions to form 5-methoxy-13β-n-propyl-Δ⁵,⁷,⁹,¹⁴-des A-gonatetraene-17β-ol, reducing the latter to form 5-methoxy-13β-n-propyl-Δ⁵,⁷,⁹-des A-gonatriene-17β-ol, reacting the latter with sodium in ammonia to form 13β-n-propyl-Δ⁹-des A-gonene-17β-ol-5-one, esterifying the latter with benzoic acid to form 13β-n-propyl-17β-benzoyloxy-Δ⁹-des A-gonene-5-one, reacting the latter with pyrrolidine to form 5-pyrrolidyl-13β-n-propyl-17β-benzoyloxy-Δ⁵⁽¹⁰⁾,⁹⁽¹¹⁾-des A-gonadiene, reacting the latter with a 1,3-dihalobutene-2 to form 3-halo-13β-n-propyl-17β-benzoyloxy-4,5-seco - Δ²,⁹-gonadiene-5-one, hydrolyzing the latter to form 13β-n-propyl-17β-benzoyloxy-4,5-seco-Δ⁹-gonene-3,5-dione, reducing the latter to form 13β-n-propyl-17β-benzoyloxy-4,5-seco-gonane-3,5-dione, condensing the latter to form 13β-n-propyl-17β-benzoyloxy-Δ⁴-gonene-3-one and recovering the latter.

In the following example there are described several embodiments to illustrate the invention. However, it would be understood that the invention is not intended to be limited to the specific embodiments.

EXAMPLE

Saponification of the Benzoate of 13β-n-propyl-Δ⁴-gonene-17β-ol-3-one (or 18,19-di-nor-13β-n-propyl-testosterone)

Step A: 0.5 gm. of the benzoate of 13β-n-propyl-Δ⁴-gonene-17β-ol-3-one, obtained according to the United States Patent application Serial No. 96,062, filed January 19, 1961 was introduced into 10 cc. of methanol. 0.125

TABLE I

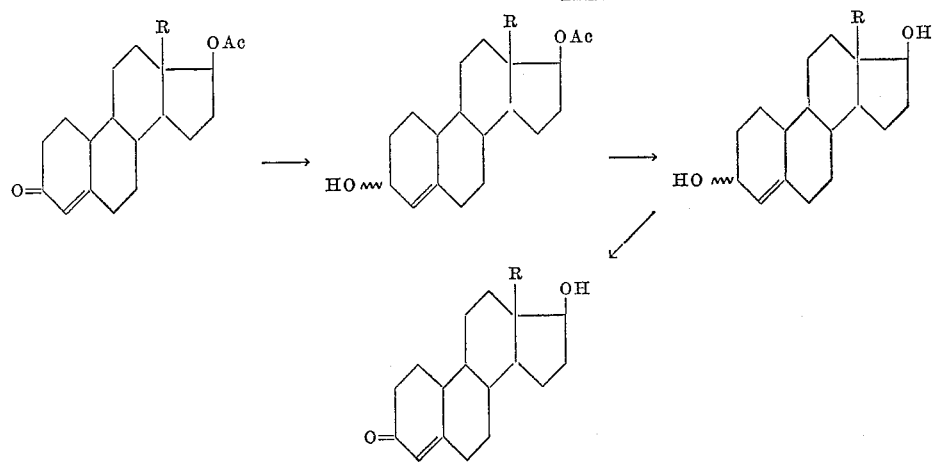

gm. of sodium borohydride was added while cooling and the reaction mixture was agitated overnight to form a mixture containing the 17β-benzoate of 13β-n-propyl-Δ⁴-gonene-3,17β-diol.

Step B: To the mixture 2.5 cc. of a 10% solution of potassium hydroxide in methanol were added and the mixture was heated to reflux for a period of four hours. The mixture was concentrated to a small volume and poured into iced water. The precipitated product was vacuum filtered, washed with water, dried and 393 mg. of raw 13β-n-propyl-Δ⁴-gonene-3,17β-diol were obtained.

This product is not described in the literature.

Step C: This last compound was dissolved in 80 cc. of dichlorethane. 2 gm. of manganese dioxide were added and the mixture was agitated at room temperature for a period of two hours. The excess manganese dioxide was filtered, the filtrate was evaporated to dryness under vacuum, and 0.400 gm. of product was obtained which was purified by chromatography over silica gel. Elution with methylene chloride containing 0.1% of methanol and 0.5% of acetone supplied 250 mg. of 13β-n-propyl-Δ⁴-gonene-17β-ol-3-one having a melting point of 163° C. and a specific rotation $[\alpha]_D^{20} = +64°$ (c.=0.5% in methanol).

Ultraviolet spectra (ethanol): $\gamma_{max}$ at 240–241 m$\mu$; $\epsilon$=16,100.

Various modifications of the process may be made without departing from the spirit or scope of the invention and it is to be understood that the invention is to be limited only as defined in the appended claims.

We claim:

1. A process for the preparation of 13β-n-propyl-Δ⁴-gonene-17β-ol-3-one which comprises reducing a carboxylic acid ester of 13β-n-propyl-Δ⁴-gonene-17β-ol-3-one wherein the carboxylic acid is an organic carboxylic acid having 1 to 18 carbon atoms selected from the group consisting of alkanoic acids, alkenoic acids, cycloalkyl alkanoic acids, phenyl carboxylic acids and phenyl alkanoic acids with an alkali metal borohydride to form the corresponding 17-carboxylic acid ester of 13β-n-propyl-Δ⁴-gonene-3,17β-diol, reacting the latter under alkaline conditions to form 13β-n-propyl-Δ⁴-gonene-3,17β-diol, oxidizing the latter with manganese dioxide to form 13β-n-propyl-Δ⁴-gonene-17β-ol-3-one and recovering the latter.

2. The process of claim 1 wherein the alkali metal borohydride is sodium borohydride.

3. A process for the preparation of 13β-n-propyl-Δ⁴-gonene-17β-ol-3-one which comprises reducing the benzoic acid ester of 13β-n-propyl-Δ⁴-gonene-17β-ol-3-one with sodium borohydride to form the benzoic acid ester of 13β-n-propyl-Δ⁴-gonene-3,17β-diol, reacting the latter in a lower alkanol under alkaline conditions to form 13β-n-propyl-Δ⁴-gonene-3,17β-diol, oxidizing the latter with manganese dioxide to form 13β-n-propyl-Δ⁴-gonene-17β-ol-3-one and recovering the latter.

4. 13β-n-propyl-Δ⁴-gonene-3,17β-diol.

5. 13β-n-propyl-17β-benzoyloxy-Δ⁴-gonene-3-ol.

References Cited in the file of this patent

UNITED STATES PATENTS

| | | |
|---|---|---|
| 3,012,941 | Wettstein et al. | Dec. 12, 1961 |
| 3,014,935 | Counsell | Dec. 26, 1961 |